US012289426B2

(12) United States Patent
Channasagara Lakshman

(10) Patent No.: US 12,289,426 B2
(45) Date of Patent: Apr. 29, 2025

(54) AUTOMATED CONVERSATIONAL MENU OVERLAY WITH IVR IN CONTACT CENTERS

(71) Applicant: Cisco Technology, Inc., San Jose, CA (US)

(72) Inventor: Nagendra Channasagara Lakshman, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 253 days.

(21) Appl. No.: 17/975,833

(22) Filed: Oct. 28, 2022

(65) Prior Publication Data

US 2024/0146842 A1  May 2, 2024

(51) Int. Cl.
*H04M 3/493* (2006.01)
*G10L 15/18* (2013.01)
*H04M 3/51* (2006.01)

(52) U.S. Cl.
CPC ....... *H04M 3/4936* (2013.01); *G10L 15/1822* (2013.01); *H04M 3/5166* (2013.01); *H04M 3/5175* (2013.01)

(58) Field of Classification Search
CPC .. H04R 3/12; H04R 2420/03; H04R 2420/05; H04R 2420/07; H04R 29/008; H04R 2430/01; H04R 1/1025; H04R 1/1016; H04R 1/1041; H04R 5/04; H04W 48/16; H04W 4/80; Y02D 30/70; G08B 7/06
See application file for complete search history.

(56) References Cited

U.S. PATENT DOCUMENTS

| | | | | |
|---|---|---|---|---|
| 6,456,699 B1 * | 9/2002 | Burg | ..................... | H04M 3/493 379/265.09 |
| 7,386,103 B1 * | 6/2008 | Chahal | .................. | H04M 3/493 379/76 |
| 8,681,968 B2 * | 3/2014 | Vendrow | ............... | H04W 40/00 379/211.01 |

(Continued)

OTHER PUBLICATIONS

Uniphore, "Increasing IVR Self-Service Rates With AI and NLP," https://www.uniphore.com/blog/increasing-ivr-self-service-rates-with-ai-and-nlp/, Jun. 7, 2021, 4 pages.

(Continued)

*Primary Examiner* — Akelaw Teshale
(74) *Attorney, Agent, or Firm* — Edell, Shapiro & Finnan, LLC

(57) ABSTRACT

At a contact center that operates to provide customer service to callers by receiving calls from the callers and directing the callers to desired endpoints that deliver information to the callers based upon an expressed intent of each caller associated with each call, a current call by the contact center is processed utilizing an Interactive Voice Response (IVR) model or a Conversational Menu (CM) model. The IVR model processes the current call by directing the current caller to a selected endpoint via navigation through a specific navigational path of nodes in a hierarchical IVR tree of nodes. The CM model processes the call by analyzing a verbal utterance of the current caller at an initiation of the current call and directing the caller to the selected endpoint so as to bypass nodes within the specific navigational path of nodes of the hierarchical IVR tree of nodes.

22 Claims, 9 Drawing Sheets

(56) References Cited

U.S. PATENT DOCUMENTS

| | | | |
|---|---|---|---|
| 10,885,278 B2* | 1/2021 | Lam | G06N 20/00 |
| 10,958,540 B1* | 3/2021 | Lilley | H04L 67/306 |
| 11,082,559 B1* | 8/2021 | Koneru | H04M 3/527 |
| 11,368,587 B1 | 6/2022 | Moreno et al. | |
| 2006/0256956 A1* | 11/2006 | Lee | H04M 3/5166 |
| | | | 379/266.01 |
| 2008/0039010 A1* | 2/2008 | Vance | G06Q 30/02 |
| | | | 455/3.06 |
| 2008/0192922 A1* | 8/2008 | Silver | H04M 1/271 |
| | | | 379/265.02 |
| 2009/0154666 A1* | 6/2009 | Rios | G10L 15/26 |
| | | | 345/168 |
| 2016/0037297 A1* | 2/2016 | Meriaz | H04W 4/021 |
| | | | 455/456.3 |
| 2016/0119474 A1 | 4/2016 | Malik et al. | |
| 2016/0241712 A1 | 8/2016 | Denby et al. | |
| 2017/0374198 A1 | 12/2017 | de Silva et al. | |
| 2018/0338041 A1* | 11/2018 | McGann | G06F 17/18 |
| 2020/0082810 A1 | 3/2020 | Kneller et al. | |
| 2020/0259957 A1* | 8/2020 | Rahman | H04M 3/5166 |
| 2024/0054995 A1* | 2/2024 | Levy | G10L 15/05 |

OTHER PUBLICATIONS

Dialogic, "Dialogic® Digital IVR," Product Brief, https://www.dialogic.com/-/media/products/docs/apps/14989-digital-vr-pb.pdf, Jun. 2018, 5 pages.

Genesys Cloud, "Intent miner overview," retrieved from https://help.mypurecloud.com/articles/intent-miner-overview/, on Oct. 27, 2022, 3 pages.

Nuance, "Conversational IVR—interactive voice response," retrieved from https://www.nuance.com/omni-channel-customer engagement/voice-and-ivr/conversational-ivr.html, on Oct. 27, 2022, 6 pages.

Ultimate, "The Ultimate chat automation solution," retrieved from https://www.ultimate.ai/chat-automation, on Oct. 27, 2022, 7 pages.

Liete, "What's the difference between standard & conversational IVR?," https://www.cognigy.com/blog/standard-ivr-conversational-ivr-differences, Oct. 27, 2020, 10 pages.

Hamilton, "Conversational IVR for Intuitive Customer Self-Service," https://www.genesys.com/blog/post/conversational-ivr-for-intuitive-customer-self-service, May 20, 2019, 4 pages.

Aisera, "How Conversational IVR is Rapidly Transforming Service Desks and Customer Service," retrieved from https://aisera.com/blog/conversational-ivr-rapidly-transforms-service-desks/, on Oct. 27, 2022, 4 pages.

* cited by examiner

400

| CALLER INTENT / NODE | UTTERANCE FROM CALLER AT START OF CALL |
|---|---|
| BANK ACCOUNT INFO / A1.1 | ACCOUNT BALANCE, CHECKING BALANCE, LAST TRANSACTION, OVERDRAWN, LAST DEPOSIT, NEGATIVE BALANCE . . . |
| BALANCE TRANSFER / A1.2 | MOVE MONEY, TRANSFER MONEY, TRANSFER FUNDS, . . . |
| CHANGE ACCOUNT INFO / A1.3 | ADDRESS CHANGE, NAME CHANGE, CLOSE ACCOUNT, . . . |
| LOAN TYPE / B1 OR B2 OR B2.2 | AUTO LOAN, HOME LOAN, HOME MORTGAGE, HOME EQUITY |
| AUTO LOAN OFFERS / B1.1 | CURRENT AUTO LOAN INTEREST RATE, PROMOTIONAL AUTO LOAN, . . . |
| APPLY FOR AUTO LOAN / B1.2 | APPLY FOR AUTO LOAN, LOAN FOR NEW CAR, . . . |
| EXISTING MORTGAGE LOAN INFO / B2.1.1 | MORTGAGE BALANCE, PAYOFF AMOUNT FOR MORTGAGE, CURRENT INTEREST RATE ON MY MORTGAGE, . . . |
| REFINANCE MORTGAGE / B2.1.2 | REFINANCE, CHANGE HOME LOAN, CHANGE INTEREST RATE, CHANGE LOAN TERMS, . . . |
| CREDIT CARD INFO REQUEST / C1 | CREDIT CARD BALANCE, CURRENT INTEREST RATE ON MY CREDIT CARD, CREDIT CARD PAYOFF AMOUNT, LAST CREDIT CARD TRANSACTION, DISPUTE CREDIT CARD TRANSACTION, . . . |
| CREDIT CARD OFFERS / C2 | PROMOTIONAL CREDIT CARD OFFER, CREDIT CARD DEALS, INFORMATION ON NEW CREDIT CARD, . . . |
| CREDIT CARD APPLICATION / C3 | OPEN NEW CREDIT CARD, OBTAIN NEW CREDIT CARD ACCOUNT, APPLY FOR CREDIT CARD, . . . |

FIG.4

AUTOMATED CONVERSATIONAL MENU OVERLAY WITH IVR IN CONTACT CENTERS

TECHNICAL FIELD

The present disclosure relates to customer call service systems for contact centers.

BACKGROUND

Traditional Interactive Voice Response (IVR) navigation in call or contact service systems for contact centers provides options for callers to choose at each level within multiple levels of hierarchy in order to direct the caller to a suitable endpoint of information or a suitable call agent. While IVR provides a certain level of functionality without minimizing the requirement for live call agents, it is also time consuming for the customer and can lead to poor customer experiences and even customer abandonment from the IVR menu before achieving a desired answer or desired information.

The next generation of navigation utilizes Conversational Menus (CMs) which attempt to use natural language recognition that interprets speech by customers and utilizing artificial intelligence algorithms in an attempt to understand what information a customer needs so as to direct the customer to the appropriate location or call agent at a call or contact center. Such CMs also suffer from inaccurate interpretations of customer requests, which can also lead to poor customer satisfaction.

BRIEF DESCRIPTION OF THE DRAWINGS

FIG. 4 is a table of initial verbal communications or utterances by callers associated with endpoints along an IVR hierarchical tree based upon historical data of calls to a contact center system according to an example embodiment.

DETAILED DESCRIPTION

Overview

Figure 1:
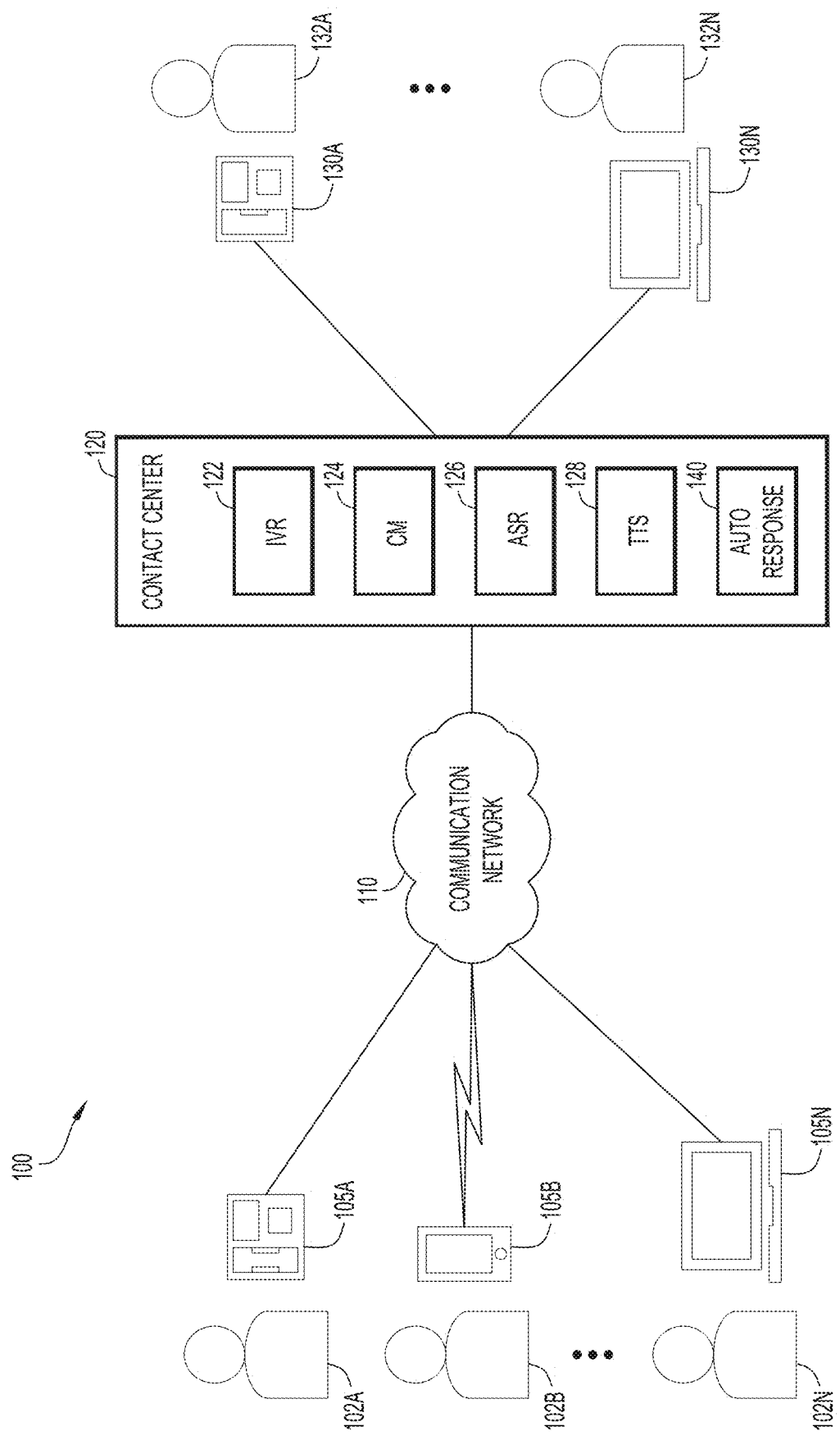
FIG. 1 is a block diagram of an environment for a contact center system according to an example embodiment.

In one example embodiment, a contact center operates to provide customer service to callers by receiving calls from the callers and directing the callers to desired endpoints that deliver information to the callers based upon an expressed intent of each caller associated with each call. A selection is made as to whether to process a current call by a current caller received by the contact center utilizing an Interactive Voice Response (IVR) model or a Conversational Menu (CM) model. In response to a selection of the IVR model to process the current call, the current caller is directed to a selected endpoint by requiring the current caller to navigate through a hierarchical IVR tree of nodes, each node including a set of options selectable by the caller in which a selected option from the set of options determines a next node in which to advance along the hierarchical IVR tree of nodes, and the selected endpoint is reached for the current caller based upon a specific navigational path along a plurality of nodes within the hierarchical IVR tree of nodes. In response to a selection of the CM model to process the current call, a verbal utterance of the current caller at an initiation of the current call is analyzed, where the analyzing comprises obtaining words from the verbal utterance, and, based upon the analyzing of the verbal utterance, the caller is directed during the current call to the selected endpoint so as to bypass nodes within the specific navigational path of nodes along the IVR hierarchical tree that leads to the selected endpoint.

Example Embodiments

In accordance with example embodiments described herein, a contact center system provides a Conversational Menu (CM) overlayed upon or integrated or combined with an Interactive Voice Response (IVR) menu for services associated with customers calling or contacting the contact center system. The CM is automatically generated and modified or updated based upon ongoing and historic responses/use of the IVR by callers to reach a desired destination that outputs information to the caller or connects the caller with an appropriate call agent. By integrating or combining the CM with the IVR, a caller can be directed to a desired endpoint or node in a hierarchy of nodes of an IVR node configuration in a faster manner, by bypassing nodes to the desired node so as to make the call experience for the caller faster, more efficient, and more pleasant or enjoyable.

A contact center system, as described herein, refers to a centralized system representing or associated in some manner with a business, governmental or educational enterprise, or any other entity or organization that provides customer service information and/or access to a live call agent representing the organization for assisting the caller with goods and/or services obtained from the organization. In non-limiting examples, a contact center system can be accessed to provide information to a caller regarding a specific account associated with the organization, to provide information associated with one or more specific products and/or services associated with the organization, and to facilitate exchange of information between the caller and the organization via the contact center system.

Referring to FIG. 1, an example system environment 100 for a contact center 120 is depicted, in which any suitable number of callers (e.g., caller 102A, caller 102B, ... caller 102N) connect with the contact center 120 over a suitable communication network 110. A caller 102N can connect with the contact center 120 over the network 110 via any suitable communication device including, without limitation, stationary or desktop phones (e.g., POTS phones or VoIP phones), mobile (e.g., cellular) phones or other mobile devices (e.g., PDAs or tablets), desktop computers, and laptop computers, which are represented generally as communication device 105A, 105B, ... 105N.

The contact center 120 is capable of receiving communication requests from and engaging in simultaneous ongoing communications with any selected number of callers 102N at any given time. Any suitable number of live call agents 132A, . . . 132N can be associated with the contact center 120 for connecting in a live conversation with callers in certain circumstances and based upon specific requests of the callers. Similar to each caller, the call agents also use a suitable communication device including, without limitation, stationary or desktop phones (e.g., POTS phones or VoIP phones), mobile (e.g., cellular) phones or other mobile devices (e.g., PDAs or tablets), desktop computers, and laptop computers, which are represented generally as communication device 130A, . . . 130N. A call agent 132N can be on site at a facility for the contact center 120 (e.g., as depicted in FIG. 1). Alternatively, a call agent 132N can be remote from the contact center 120, where the call agent 132N communicates, via a communication device 130N and over the network 110, with the contact center 120 and a caller 102N.

The communication network 110 may include one or more wide area networks (WANs), such as the Internet, and one or more local area networks (LANs), telephone networks (e.g., public switched telephone networks or PSTNs), wireless or mobile phone or cellular networks, and any suitable combinations thereof. Each communication device 105A and 105N communicates in a suitable manner with the contact center 120 via the network 110. While callers can communicate with the contact center using dual tone multi-frequency (DTMF) signals (i.e., by keystroke inputs from the keypad of the communication device 105N), audio inputs by callers (i.e., callers requesting desired information via microphones of their communication devices) are also processed appropriately by the contact center.

The contact center 120 includes one or more tools comprising one or more software applications that can be grouped in modules, where the modules perform functions for the contact center in the manner as described herein. The one or more modules can include an IVR (Interactive Voice Response) module 122, a Conversational Menu (CM) module 124, an Automatic Speech Recognition (ASU) module 126, and a Text To Speech (TTS) module 128. The contact center 120 performs its duties by receiving calls from callers via their communication devices, where the calls comprise audio content that is processed by the contact center utilizing at least one or more of modules 122-128. While the example embodiment depicts the contact center as including a plurality of software modules, it is noted that the one or more software applications that perform the features to achieve the operations of the contact center as noted herein can also be provided in a single module.

When a call from a caller 102N, via communication device 105N, is received at the contact center 120, the audio content of the call can be converted to digital text (i.e., digital characters forming the words from the audio content) via the ASR module 126, where the digital text can be analyzed by the IVR module 122 and/or the CM module 124 as described herein for processing of the call. In certain situations, as described herein, the contact center 120 can provide or transmit an automated audio voice response to the caller by converting digital text for the response to speech (or some other form of audio response) utilizing the TTS module 128. Any conventionally known or other suitable software can be utilized to implement the operability features of the ASR module 126 and the TTS module 128. The contact center further includes an Auto Response module 140 that includes a series of recorded audio voice responses that can transmitted to the caller's communication device 105N under certain situations as described herein. In other embodiments, the digital text can be used by the contact center to direct the caller to an appropriate call agent 132N (i.e., by connecting the communication device 105N of the caller 102N) with the communication device 130N of the call agent 132N).

Figure 2:
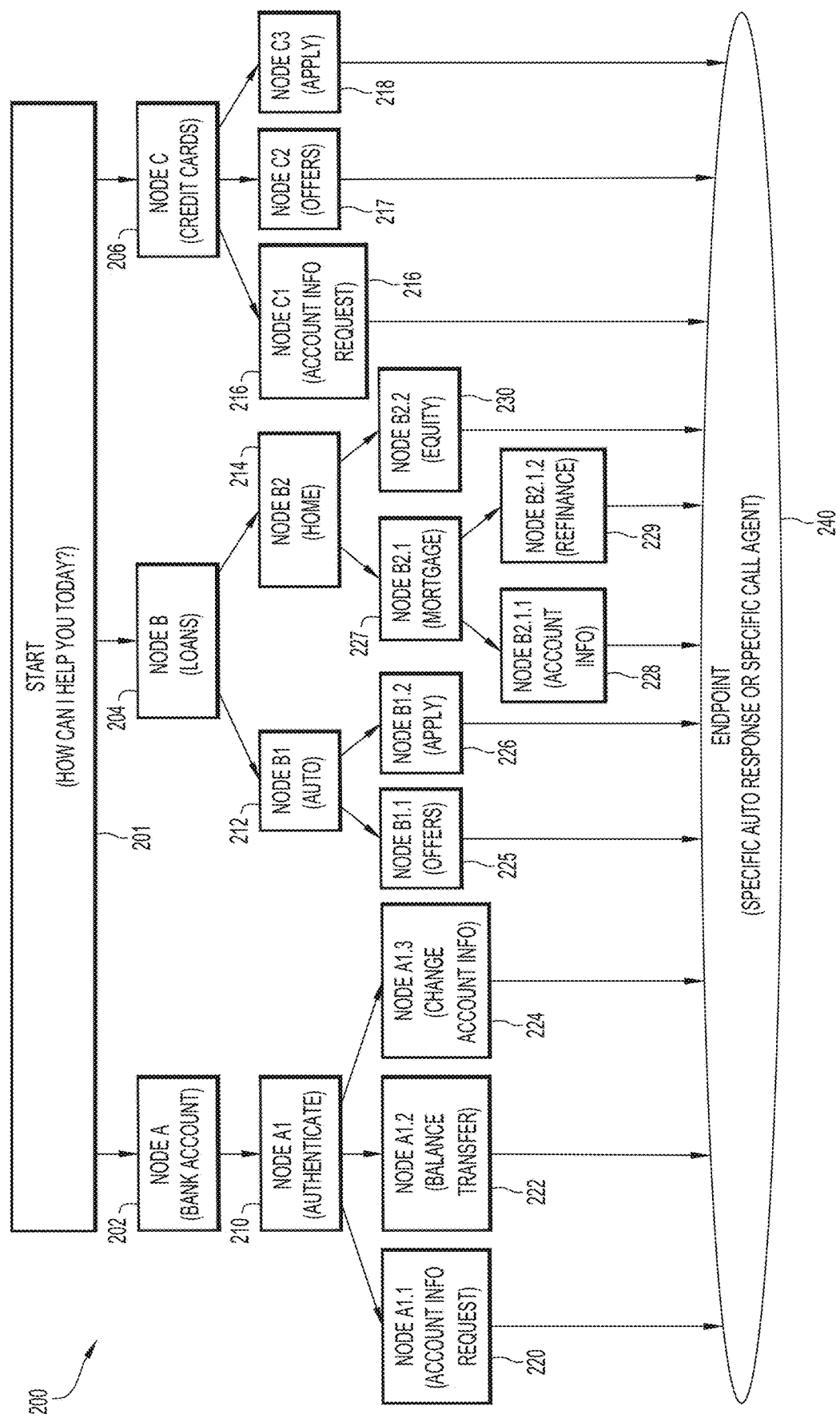
FIG. 2 depicts a hierarchical tree of conversational nodes that would be traversed using IVR during a call to a contact center by a user according to an example embodiment.

The IVR module 122 implements an IVR model in which an IVR hierarchical tree of nodes provide automated responses and/or queries for the caller 102N, where traversing from one node to another within the IVR hierarchy will depend upon the caller's response. An example embodiment of a hierarchical set or tree of nodes (also referred to herein as IVR tree 200) is depicted in FIG. 2. The IVR hierarchical tree of nodes, also referred to herein as an IVR tree 200, comprises a starting point or start node 201, which represents the first interaction of the caller with the contact center (e.g., automated voice recording from contact center prompting the following automated statement: "How can I help you today?"). Each node within each hierarchical level or layer of the IVR tree 200 represents a series of choices from which the caller selects and, based upon a selected choice, designates which further node at the next layer to direct the caller for the next interaction (i.e., by making a next selection of a single choice from a selection of choices at the next node layer). Thus, the responses by the caller at nodes within the IVR tree 200 determine how the call traverses through layers of the IVR tree 200 to get to a conclusion or end node of the call. Ideally, at the end node of the call, the caller receives an adequate response to their query or purpose/desired intent for contacting the contact center.

The Auto Response module 140 can store a unique automated verbal query and/or response that is assigned for each node in the layers until an endpoint in the IVR tree is reached. Thus, the IVR model, using the IVR tree 200, operates to provide automated queries or responses at each node for each layer until reaching an endpoint 240 to the call, in which a final automated response can be provided or connection between the caller and a call agent is established. This serves to limit the time of interaction between a live person/contact agent and a caller as well as direct the caller to the appropriate automated response or (if necessary) the appropriate call agent so as to maximize efficiencies at contact centers (i.e., not requiring every call to be routed to a call agent if not necessary, and also making a best determination of purpose or intent of call before routing to the appropriate call agent).

In the example embodiment of FIG. 2, the IVR tree 200 is configured for use with a banking organization that provides bank accounts, loans and credit cards for its customers. The caller 102N contacts the contact center 120 to get information for at least one of these three broad categories. It is noted that the IVR tree 200 is provided only for example purposes, and the IVR tree is further simplified to only a few layers of interaction with callers. It is noted that the embodiments as described herein are operable for use with any IVR tree for any type of organization or entity and with any number of hierarchical layers and nodes within the IVR tree.

In the IVR tree 200, the initial or starting node 201 provides options for the caller (e.g., in addition to an opening greeting), requiring the caller to select from one of the options in order to proceed or advance within the call so as to achieve or reach a desired conclusion. The caller is provided with the option of choosing between Node A: Bank Accounts (node 202), Node B: Loans (node 204), and Node C: credit cards (node 206). For example, the starting node might provide an opening statement from the contact center 120 to the caller 102N such as "How can I help you today? Please press 1 or say Bank Account, press 2 or say Loan, or press 3 or say Credit card". The caller can then either state one of the three options or, using the keypad of the communication device 105N, select the number 1, 2 or 3. If the caller provides a verbal response, the audio content is analyzed, via ASR module 126, and is converted to digital text for analysis and interpretation by the IVR module 122. A keypad entry by the caller can also be transmitted to the IVR module 122 for interpretation of the selected node chosen by the caller. Upon reaching the selected node in the first layer of the IVR tree 200, the IVR module 122 can then proceed to provide a further set of node options requiring the caller to select one option from the set. Analysis and interpretation of the caller response then results in traversal of the IVR tree 200 to the next layer, requiring the caller to select from a further set of options, and so on until the caller has traversed the layers of nodes to reach a conclusion or endpoint 240 via an endpoint node that immediately precedes the endpoint.

For example, in scenarios in which the caller is interested in information about the caller's bank account, Node A (node 202) can be selected in response to the initial query by the contact center 120. The caller then proceeds to the next node layer, Node A1 (node 210), in which an authentication may be made (e.g., entry of caller's account number and/or password) to proceed along this node path. The next layer provides a set of nodes, Node A1.1 (node 220), Node A1.2 (node 222), and Node A1.3 (noted 224), where, e.g., the automated query for Node A1 (after authentication is achieved) may be "Please say Account Information or press 1, say Balance Transfer or press 2, or say Account Changes or press 3"). Based upon the choice made by the caller, the endpoint 240 is then reached in which the caller may be directed to a call agent suitable for the choice made or an automated response. For example, an account information request may yield an automated response, generated utilizing the TTS module 128 (e.g., obtaining account balance information, last transaction, etc. for caller's account as identified by previous authentication and then generating an automated verbal speech response utilizing the TTS module and providing to the caller). A request for a balance transfer or a change of account information (e.g., caller's home address, phone number, etc.) can result in a call agent qualified to handle such a request to be connected with the caller. For example, the same call agent selected can be suitably trained to assist for both the balance transfer request (endpoint node A1.2) and the change of account information request (endpoint node A1.3), or the call agent may differ based upon the specific node requested.

Other example node pathways through the IVR tree 200 that result in an endpoint response for the caller (auto response or call agent to provide information specific to the caller's query) include the following:

Intent to hear promotional offers for auto loans Node B: Loans (node 204)→Node B1: Auto (node 212)→Endpoint Node B1.1—Promotional offers (node 225) →Endpoint 240

Intent to apply for a new auto loan: Node B: Loans (node 204)→Node B1: Auto (node 212)→Endpoint Node B1.2: Apply for auto loan (node 226)→Endpoint 240

Intent to receive account information on an existing home mortgage (or apply for a new home mortgage loan): Node B: Loans (node 204)→Node B2: Home (node 214)→Node B2.1: Mortgage (node 227)→Endpoint Node B2.1.1: Account Information (node 228)→Endpoint 240

Intent to request a refinance of existing home mortgage: Node B: Loans (node 204) 4 Node B2: Home (node 214)→Node B2.1: Mortgage (node 227)→Endpoint Node B2.1.2: Refinance (node 229)→Endpoint 240

Intent to obtain information on existing home equity loan: Node B: Loans (node 204) 4 Node B2: Home (node 214)→Endpoint Node B2.2: Equity (node 230)→Endpoint 240

Intent to receive information for existing credit card: Node C: Credit card (node 206) 4 Endpoint Node C1: Credit card account information request (node 216) →Endpoint 240

Intent to hear offers for new and/or existing credit cards: Node C: Credit card (node 206)→Endpoint Node C2: Credit card offers (node 217)→Endpoint 240

Intent to apply for a new credit card: Node C: Credit card (node 206)→Endpoint Node C3: Credit card application (node 218)→Endpoint 240

Thus, when utilizing the IVR navigation process of the IVR model (utilizing the IVR module 122), an expressed intent of the caller is achieved based upon the caller traversing the IVR tree 200 along a selected IVR navigational path of nodes to reach the desired endpoint. In other words, the intent of the call by the caller is expressed by choosing which node to select at each level or layer of the hierarchical IVR tree of nodes, thus traversing a specific and selected path of nodes to reach the destination endpoint desired by the caller.

For certain specific endpoints associated with the IVR tree, a specific call agent (or a call agent from a specific group) may be connected with a caller based upon a specified endpoint node which has been traversed within the IVR tree by the caller. For example, in the IVR tree 200, a first call agent specialized in customer service for bank accounts may be connected to the caller in the event a caller traverses the IVR tree to an Endpoint node A1.3 (caller wants to change bank account information) which designates a specific endpoint 240. A second call agent specialized in customer service for auto loans may be connected to the caller in the event a caller traverses the IVR tree to an endpoint node B1.2 (caller wants to apply for an auto loan) which designates a specific endpoint 240, while a third call agent specialized in customer service for home mortgage loans may be connected to the caller in the event a caller traverses the IVR tree to an endpoint node B2.1.2 (caller wants to refinance an existing mortgage) which designates a specific endpoint 240. Further still, a call agent specialized in customer service for credit cards may be connected to the caller in the event a caller traverses the IVR tree to an endpoint node C3 (caller wants to apply for a credit card) which designates a specific endpoint 240.

Depending upon a particular intent by a caller to obtain information from the contact center, any number of layers of nodes may need to be traversed prior to the caller reaching the endpoint destination in the IVR tree. While the example IVR tree 200 is simplistic and provided merely for illustrative purposes, IVR trees at contact centers can be much more complex and involve a large number of layers before reaching a destination endpoint at which the information and/or service desired by the caller is finally obtained (by call agent or by automated response). As previously noted herein, this can lead to frustration by the caller in having to traverse through so many node layers and selecting options. Further, in the event the caller mistakenly chooses the wrong option, this could lead the caller to traverse down an incorrect node path to the incorrect endpoint. Such issues can lead to a caller abandoning the call and to an overall feeling by the caller of poor customer service provided by the organization.

In the embodiments described herein, the CM module 124 implements a CM model that operates to bypass nodes and/or node levels or layers based upon learning a desired endpoint in the IVR tree 200 that corresponds with the first verbal communication or utterance by the caller at the starting point or start node 201. In example embodiments, the CM module 124 classifies the first or introductory/opening statement or utterance by a caller 102N at the start of the call/start node 201 (e.g., after the automated voice message "How can I help you today?") based upon a correlation of the first verbal communication or verbal utterance with similar first utterances (e.g., same or similar language used) in previous calls that have been stored in a historical IVR navigation database of the CM module and corresponding or linked with determined endpoint nodes and specific endpoints linked with the endpoint nodes which were reached during the previous calls. The first or initial utterance of a caller in a customer service call can provide an expressed intent by the caller of what the caller desires to obtain (e.g., general information or information regarding a specific service) from the call. This is particularly the case when a broad introductory question is provided by the contact center at the start of the call such as "How can I help you today?" or "Please provide the purpose of you call today." The verbal utterance can be provided as audio content (e.g., the caller speaks within a microphone of their communication device). Alternatively, the verbal utterance can be provided as a text-based utterance (e.g., a typed statement). In example embodiments, the utterance is audio content that is converted to digital content as described herein. The CM module 124 operates to constantly update the historical IVR navigation database on an ongoing basis by recording introductory utterances by callers linked with endpoint node outcomes so as to continuously train the CM module (so that it does not deteriorate over time).

Figure 3:
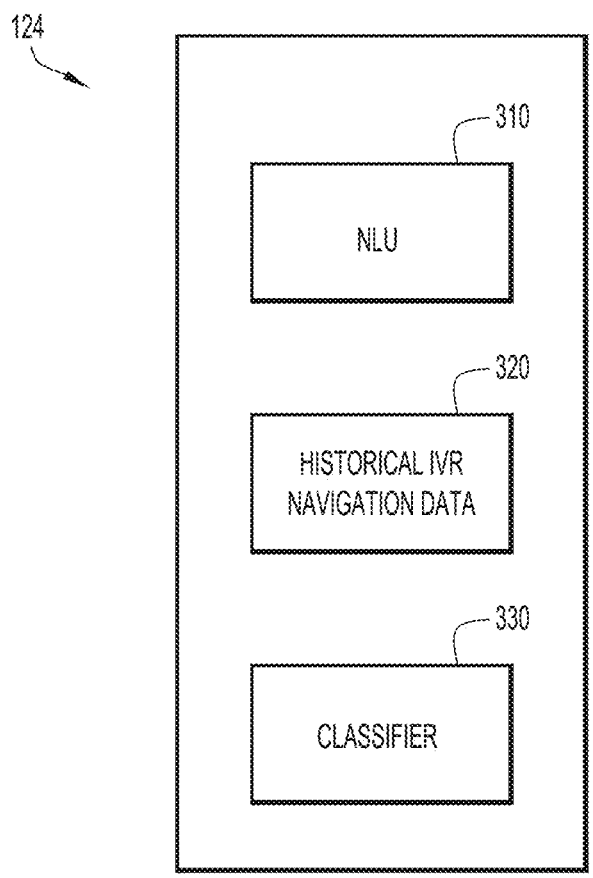
FIG. 3 is a block diagram of a Conversational Menu (CM) module that implements a CM model for a contact service system according to an example embodiment.

Referring to FIG. 3, the CM module 124 includes a Natural Language Understanding (NLU) module 310, a Historical IVR Navigation Data module 320, and a Classifier module 330. As described herein, the NLU module 310 includes a parser which can parse words of the initial verbal communication of a caller (at the start of the call) so as to shorten an initial utterance by the caller to keywords for analysis and classification as described herein. For example, The NLU module 310, utilizing the ASR module 126, converts the verbal communication or utterance of the caller to text and then analyzes the text for any potential parsing of certain common introductory phrases (such as "I am interested in" or "I would like to") and/or common grammatical terms (such as "of", "and" and "the"). In an example embodiment, the following utterance of a caller (in response to "How can I help you today?") might be "I would like to apply for a home mortgage loan". The NLU module 310 could remove or extract common words such as "I would like to", "for" and "a", leaving "apply home mortgage loan" in the utterance for analysis.

The Historical IVR Navigation Data module 320 stores data associated with calls in which callers have navigated the IVR tree to desired responses or specific endpoints 240 based upon traversed endpoint nodes (e.g., one of nodes A1.1/220, A1.2/222, A1.3/224, B.1/225, B1.2/226, B2.1.1/228, B2.1.2/229, B2.2/230, C1/216, C2/217, and C3/218 of IVR tree 200). In particular, for each completed call (or for a specified number of calls) to the contact center 120, the initial utterance of the caller (at node 201) can be linked with the specific endpoint node and its corresponding specific endpoint that results from traversing a specific node path in the IVR tree. For example, for a completed call to the contact center, the initial utterance by a caller of "I would like to apply for an auto loan", which results in navigation of the IVR tree to endpoint node B1.2 and to a corresponding endpoint 240, the utterance (or a parsed version thereof, such as "apply for auto loan") is saved along with the specific endpoint node (node B1.2/226) and its corresponding specific endpoint 240 (e.g., a call agent from the auto loan group of the organization).

When a sufficient amount of historical IVR navigation data has been saved to module 320 (e.g., based upon a specified number of completed calls to the contact center), the Classifier module 330 can be used to classify, associate or link an incoming call to a corresponding endpoint node/endpoint 240 based upon the initial utterance (e.g., as parsed by the NLU module 310) of the caller at the start of a new call to the contact center. Referring to FIG. 4, an example embodiment of historical call data saved in the Historical IVR Navigation Data module 320 is depicted, in which initial utterances of callers is associated with final endpoint nodes (traversed via the IVR tree). The data is depicted in the form of a table 400 (and is further based upon the IVR tree 200), in which the first (left) column includes the endpoint node (which also identifies intent of caller in making the call) and initial utterances (e.g., parsed by the NLU module 310) associated with calls that resulted in a traversal of the IVR tree to such endpoint node. Referring, e.g., to endpoint node A1.1 (caller's intent is to receive bank account information) in Table 400, saved utterances associated with this endpoint node include "account balance", "check balance", "last transaction", "overdrawn", "last deposit", etc. Other endpoint nodes are also shown in Table 400 that are associated with utterances that are relevant to such endpoint nodes.

Figure 5:
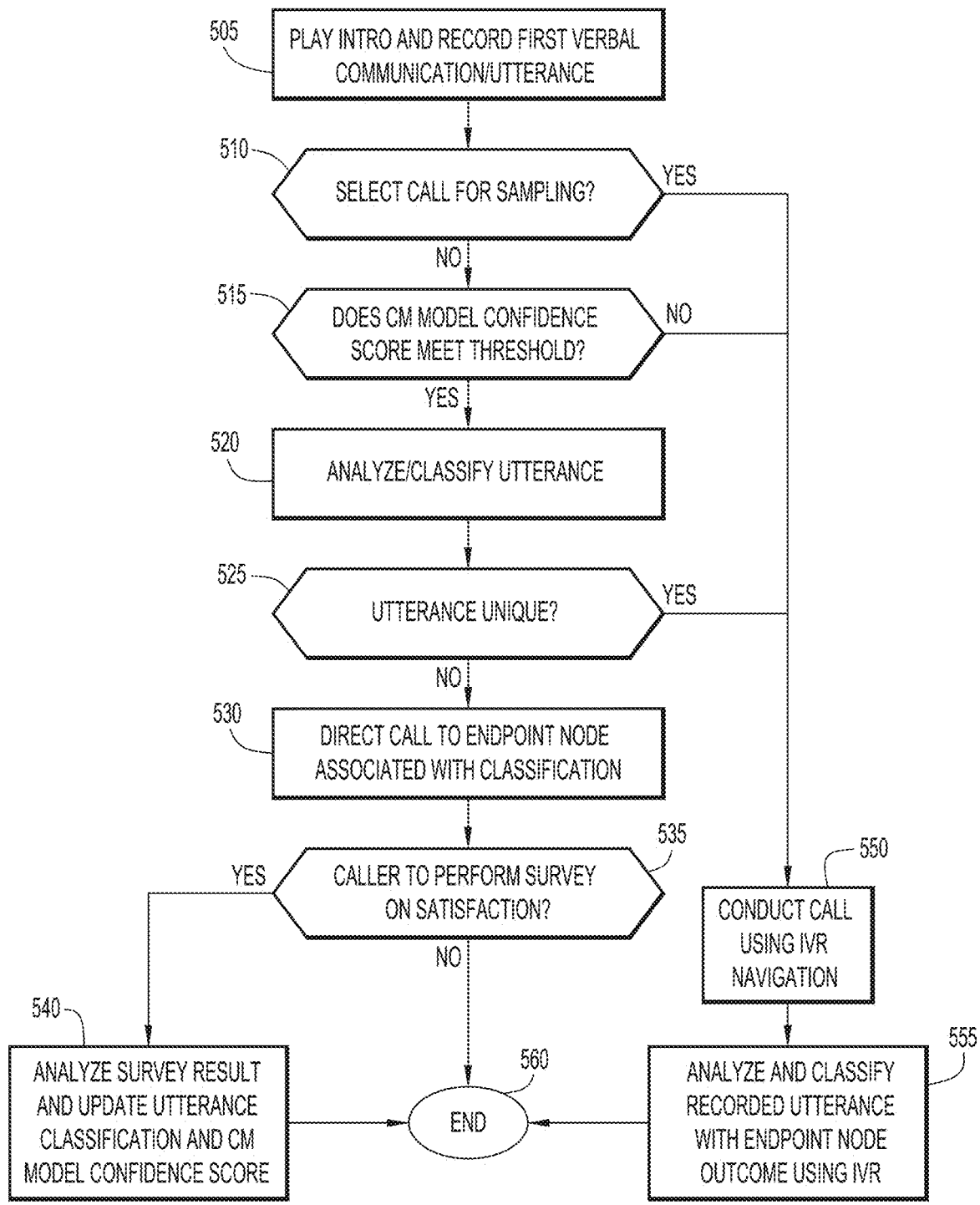
FIG. 5 is a flowchart of a process in which a CM model is overlayed or integrated with an IVR model for determining a selected endpoint by which to direct a caller at the contact center according to an example embodiment.

An example embodiment of the operational steps for overlaying or integrating a CM model with an IVR model at a contact center is described with reference to FIG. 5. At 505, a call by a caller 102N is made to the contact center 120 via the caller's communication device 105N. At the initiation of the call, the CM module 124 is operable and provides an automated audio query (e.g., via the Auto Response module 140) such as "Hello. Welcome to ABC Bank. How can I help you today?" The initial verbal communication/response or utterance by the caller is recorded and saved for further processing.

At 510, the CM module 124 determines whether to select the incoming call for sampling, in which the IVR model is implemented using the IVR menu and IVR tree 200. For example, a selected percentage or small amount of call traffic (e.g., about 10% or less of all incoming calls) to the contact center can be subjected to the IVR navigation process (i.e., CM model is not implemented for sampled calls). This allows for constant updating and development of the historical IVR navigation data so as to enhance accuracy of the classification of initial call utterances to endpoint nodes in the IVR tree. The sampling further enhances the calibration and training of the CM model by the NLU module 310 so as to prevent deterioration of the historical IVR navigation data over time. For example, language and speech is constantly evolving, where the words for utterances can change over time (e.g., common words used, different voice inflections, voice cadences, voice accents, etc.). By continuously sampling a select number of calls (bypassing the CM model and only using the IVR model/

IVR navigation to obtain new data sets), the CM model can also be continuously updated by adding and/or revising utterances that are assigned to endpoint nodes of the IVR tree in the Historical IVR Navigation Data module 320.

In the event the call is selected for sampling, the call is conducted using the IVR model implemented by IVR module 122 at 550, which requires level-by-level or layer-by-layer navigation of nodes within the IVR tree 200 to a final endpoint node and corresponding endpoint. In this instance, an automated audio voice query (obtained, e.g., from the Auto response module 140) is provided and includes node choices for selection by the caller (requiring the caller to navigate the IVR tree 200). For example, an automated query by the IVR module 122 can be provided as follows: "Please choose from the following options: say Bank Account or select 1, say Loans or select 2, or say Credit Cards or select 3." The caller then navigates through the IVR tree, by selecting from a group of choices, until the endpoint node and endpoint of interest are reached (resulting in a specific automated response being provided and/or a specific call agent associated with the endpoint node is connected with the caller). At 555, upon termination of the call, the initial recorded and saved utterance by the caller is analyzed by the CM module 124 and classified or linked with the endpoint node that reached based upon the navigation through the IVR tree 200 by the caller. The analysis includes conversion of the audio content comprising the utterance to text (via the ASR module 126), potential parsing of the utterance using the NLU module 310, and then comparing with utterances already stored in the Historical IVR Navigation Data module 320 (e.g., in a format such as Table 400). If the utterance is the same (e.g., identical or substantially similar) to an utterance already stored for the endpoint node, no further action need be taken and the CM module 124 ceases further analysis of the call at 460. If the utterance is considered to be new, the utterance linked with the endpoint node reached in the call can be stored in the Historical IVR Navigation Data module 320 (e.g., adding the new utterance to the Utterance column at the location that corresponds with its corresponding endpoint node in the Endpoint Node column in Table 400). The CM module 124 then ends the analysis of the call at 560. Alternatively, the caller can be prompted with an automated query such as "Is there anything else I can help you with?", which (if answered in the affirmative) can result in the process starting over (at step 505).

In the event the call is not selected for sampling, the CM module 124 (at 515) next determines whether a confidence score for the CM model meets a threshold. A confidence score for the CM model can be determined based upon a number of factors. For example, when the total number of calls to the contact center that have been subjected to the CM model process of FIG. 5 is below a number (e.g., no greater than 200), there may not be enough historical IVR navigation data available to classify or link the initial utterance of a caller to an appropriate endpoint. This will be the case, e.g., when the contact center has just started service and/or the CM model was recently implemented for use with the contact center. The confidence score may be set to a value below a threshold to avoid using the CM model until such time as a sufficient number of calls have occurred (and sufficient training/learning by the CM module has occurred). In another example, the confidence score can keep track of a number of "unique" calls in which the CM model is used. A "unique" call can be determined or identified by the CM module as a call in which the first utterance of the caller, or its parsed (i.e., reduced word) version, is not identical or does not sufficiently match (i.e., fails to match) any other utterance stored in the Historical IVR Navigation Data module 320. When a certain number of "unique" calls is reached (e.g., 25 "unique" calls), the process can fall back or revert to use of the IVR navigation for a set number of calls so as to facilitate the development of more data for the Historical IVR Navigation Data module 320 (where the confidence score can be built up again or increased after a set number of calls has been processed using IVR navigation). Further, the confidence score can be determined or adjusted based upon actual feedback information provided by callers, such as a customer survey taken at the end of a call to determine whether the caller was successfully matched with an appropriate endpoint).

All of these (and/or other) factors can be used to determine a confidence score for the model that is ongoing and can change over time. This facilitates incremental training and additions/revisions/adjustments to the historical IVR navigation data saved in module 320, which ensures that the CM model can evolve with evolving language usages while also maintaining a sufficient degree of accuracy and success in directing callers to a desired endpoint at the contact center.

In response to a confidence score not meeting a threshold value (e.g., confidence score is less than a threshold value on a numerical scale between 0 and 1, such as 0.7), the IVR model is implemented requiring IVR navigation using the IVR tree 200 (steps 550, 555, 560). If the confidence score meets or exceeds the threshold value (e.g., confidence score is 0.7 or greater), the CM module 124 (at 520) implements the CM model and analyzes and classifies the utterance by the caller (utterance obtained at 505). The NLU module 310 converts the audio content/verbal communication or utterance of the caller (using ASR module 126) into text, where the text can be parsed in the manner described herein (to reduce extraneous words such as "I", "we", "the", "and", etc.) and then compared with utterances stored in the Historical IVR Navigation Data module 320 (e.g., in Table 400). A perfect or identical match of the utterance by the caller with another utterance stored in the Historical IVR Navigation Data module 320 provides a high degree of confidence for classification of the call, and the confidence number for the CM model can be adjusted accordingly (e.g., maintained or increased).

In the event there is not a perfect match found, the NLU module 310 can also analyze words in the utterance of the current call for potential synonyms with words in utterances stored in the Historical IVR Navigation Data module 320. For example, referring to node B1.2 (auto loan), the utterances from previous calls classified or linked with this node can include "apply for auto loan", "loan for new car", etc. An unparsed utterance by the caller from the current call being analyzed might be "I want to borrow money to purchase a new truck". The NLU module 310 (e.g., utilizing thesaurus data or accessing a thesaurus database) can parse this utterance to the keywords "borrow money" and "purchase new truck" and then further determine synonyms for some or all of the keywords (e.g., "loan" synonymous with "borrow" and "truck" synonymous with "car") in order to classify with some degree of confidence that the caller utterance should be linked with node B1.2 in IVR tree 200.

In a scenario in which none or very few of the words from the caller utterance (in the current call being analyzed) is recognized or associated with words stored in the Historical IVR Navigation Data module 320, the call can be identified as "unique" (at 525). In the event a call is determined to be "unique", the process reverts to IVR navigation (using IVR tree 200, and steps 550, 555 and 560 of the process). The confidence score for the CM model is also modified (e.g., decreased and number of "unique" calls is increased).

If new (not stored) words from the caller utterance are found to be synonymous with words stored and linked with IVR endpoints in the Historical IVR Navigation Data module 320, the NLU module can store such new words and link with the corresponding IVR endpoint in the module 320 (e.g., store the words "borrow" and "truck" in the Utterance column of Table 400 at the location that corresponds with the column for endpoint B1.2). Depending upon a number of synonymous words found, the confidence score might be maintained or slightly decreased.

A perfect match or a sufficient match (e.g., sufficient number of words determined to be synonymous) of the caller utterance with stored utterances in the Historical IVR Navigation Data module 320 results (at 530) in a classification of the call with the endpoint node and resultant endpoint in the IVR tree 200. For example, in the example noted herein of an initial or first caller utterance of "I want to borrow money to purchase a new truck", the caller would be connected with a call agent in a call agent group assigned to node B1.2 (auto loan agents).

Optionally (at 535), after the caller has received the endpoint information (automated message or ended communication with call agent), the caller may be requested to participate in a customer satisfaction survey on grading the customer service experience (e.g., determining whether the contact center directed the caller to the desired endpoint and in a timely manner). For example, the survey may ask the caller to rate the success of the call (based upon quickly and/or how accurately the caller was directed to the appropriate source of information and/or desired call agent) with a question such as: "On a scale of 1-5, how was your satisfaction in obtaining the information you needed in a timely manner, with 1 being low and 5 being high?"). Such survey information can also be used to adjust the confidence score to determine whether further training of the CM model is necessary, or whether the CM model is working satisfactorily at the present time. The call can then be ended (at 560). Alternatively, the caller can be prompted with an automated query such as "Is there anything else I can help you with?", which (if answered in the affirmative) can result in the process starting over (at step 505).

In addition (or as an alternative) to utilizing a customer satisfaction survey at the end of a call (step 540) where direct feedback from callers can be used to adjust the confidence score (e.g., a poor caller rating of the call may lower the confidence score, while a good or better rating might increase the confidence score), utterances by callers at the end of calls to call agents may also be used as indirect feedback to assess caller sentiment and satisfaction of the outcome from the call. For example, an utterance by a caller at the end of a call (e.g., caller's final statement before ending call might be: 1. "Great, this is exactly the information I needed" or 2. "Hmm, OK, good-bye") can be rated or ranked by the call agent as an indication of call success (e.g., first statement might indicate high degree of call success, while second statement might indicate low degree of call success) and whether to adjust the confidence score of the CM model. The indirect feedback by the caller, as interpreted or ranked by the call agent speaking with the caller, can be used to adjust the confidence score accordingly (e.g., higher degree of call success raises or maintains confidence score, lower degree of success lowers confidence score).

A further embodiment in which the confidence score for the CM model might be adjusted is monitoring whether the caller is transferred one or more times from an initial endpoint to the final endpoint that is desired by the caller and then adjusting the confidence score accordingly based upon number of transfers from an undesired endpoint to the final desired endpoint. In this embodiment, a reverse correlation exists between endpoint transfers and confidence score, where fewer or no transfers (e.g., 0 or 1 transfer) results in maintaining or increasing confidence score while transfers above a threshold number (e.g., 2 or more transfers) results in decreasing the confidence score with increasing number of transfers. For example, in the embodiments described herein utilizing IVR tree 200, an initial utterance of a caller during a current call might be "I am interested in refinancing my home loan", where this call is then selected for sampling so as to be directed along all nodes in a node path to an endpoint along the IVR tree (i.e., steps 510, 550 and 555). The caller may select, during the IVR options (either by DTMF keypad entries or voice response), node B (204) →loans, followed by node B2 (214)→home, and then node B2.2 (230)→equity before reaching a first endpoint (e.g., a call agent in the home equity call agent group). The selection of node B2.2 (230) by the caller was in error (based upon the caller's expressed intent in the initial utterance), where the caller should have selected node B2.1 (227)→mortgage, and then B2.1.2 (229)→refinance, in order to proceed to the appropriate endpoint for home mortgage refinancing (e.g., a call agent in the refinance group and/or new home loan group). Upon the caller reaching the home equity group call agent and explaining this is not the information desired by the caller, the home equity group call agent may redirect or transfer the caller to the appropriate call agent at the home mortgage refinance group. During the analysis and classification of the utterance (step 555), the confidence model may be adjusted due to the transfer from a first endpoint to a final endpoint of the call. Further still, a determination may be made to either not classify the recorded utterance (e.g., not add any keyword from the utterance to any endpoint) or classify the utterance with the final endpoint (e.g., classify keywords of the utterance with node B2.1.2 instead of B2.2), while optionally also adjusting the confidence score (e.g., lowering confidence score based upon incorrect initial endpoint reached). In this example, the process prevents inadvertent classification of utterances with endpoint nodes associated with corresponding endpoints due to caller error in using the IVR model and/or when a first endpoint reached turns out to be incorrect (i.e., transfer of caller from first endpoint to final endpoint is required).

The confidence score for the CM model can therefore be adjusted based upon any one or more factors such as those previously described herein, including direct feedback from the callers (e.g., via customer service surveys taken by callers at the end of calls) and indirect feedback from the callers (e.g., call service agents assessing caller demeanor or sentiment based upon final utterances of the callers before the end of calls) and also other data obtained from the calls (e.g., any endpoint transfer or number of endpoint transfers required for callers to reach their desired endpoints, whether utterances of current calls are successfully matched with utterances from previous calls associated with the endpoints for the calls, etc.). Such factors can be combined and/or weighted in any selected manner to obtain an overall confidence score for the CM model.

Thus, the systems and methods described herein facilitate use of the CM model overlayed with an IVR navigation for customer service calls to a contact center, in which a complete IVR navigation (e.g., traversing various nodes and node layers) can be bypassed by navigating the caller directly to an endpoint node and desired endpoint based upon the first or initial utterance by the caller.

Figure 6A:
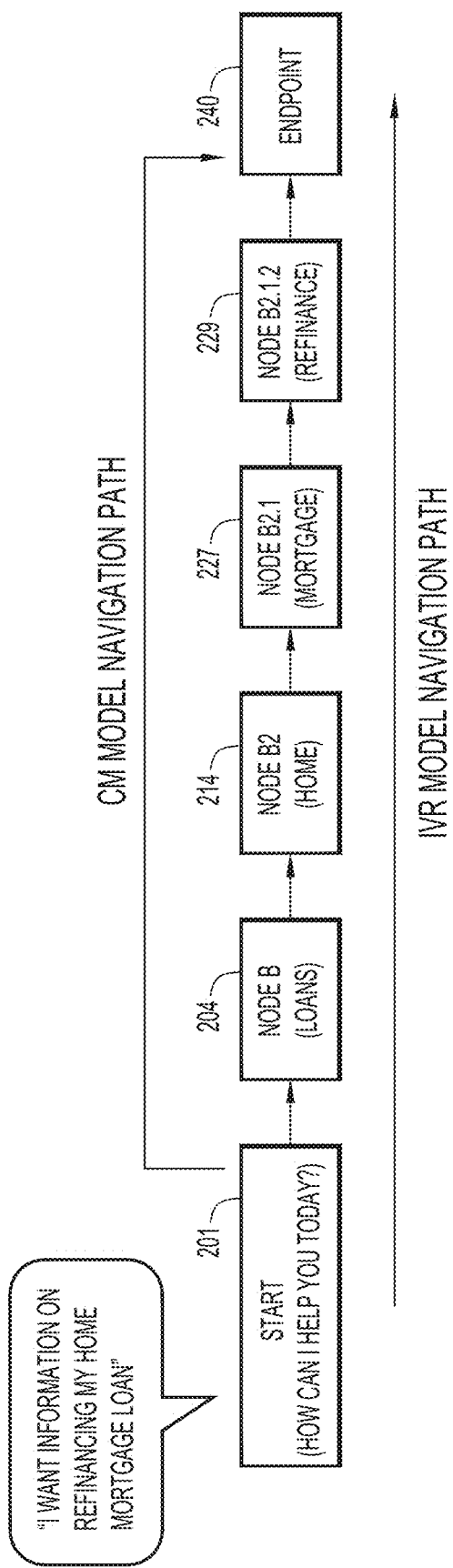
FIGS. 6A, 6B and 6C depict embodiments of traversal of the IVR tree of FIG. 2 utilizing a CM model, in which nodes and/or node layers of the IVR tree are bypassed, according to example embodiments described herein.
Figure 6B:
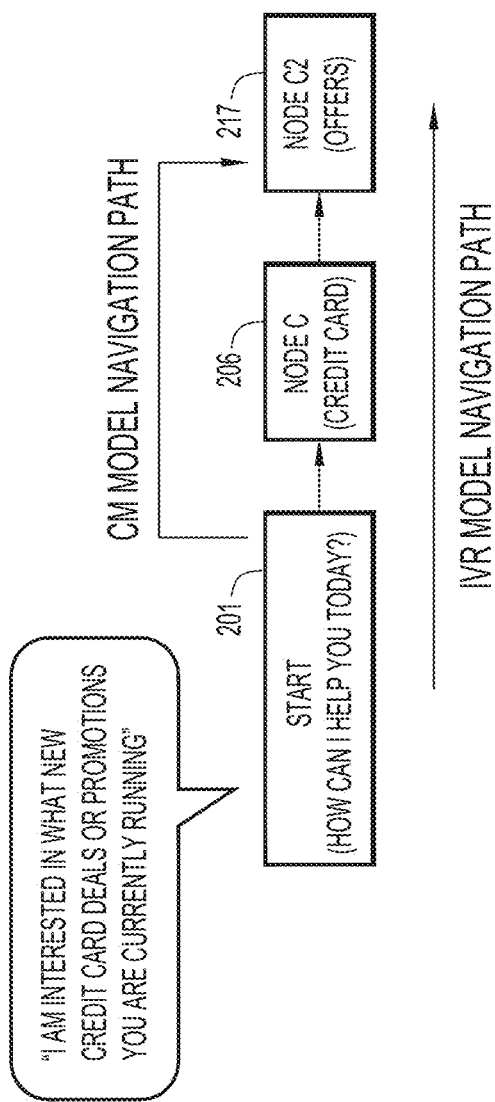
Figure 6C:
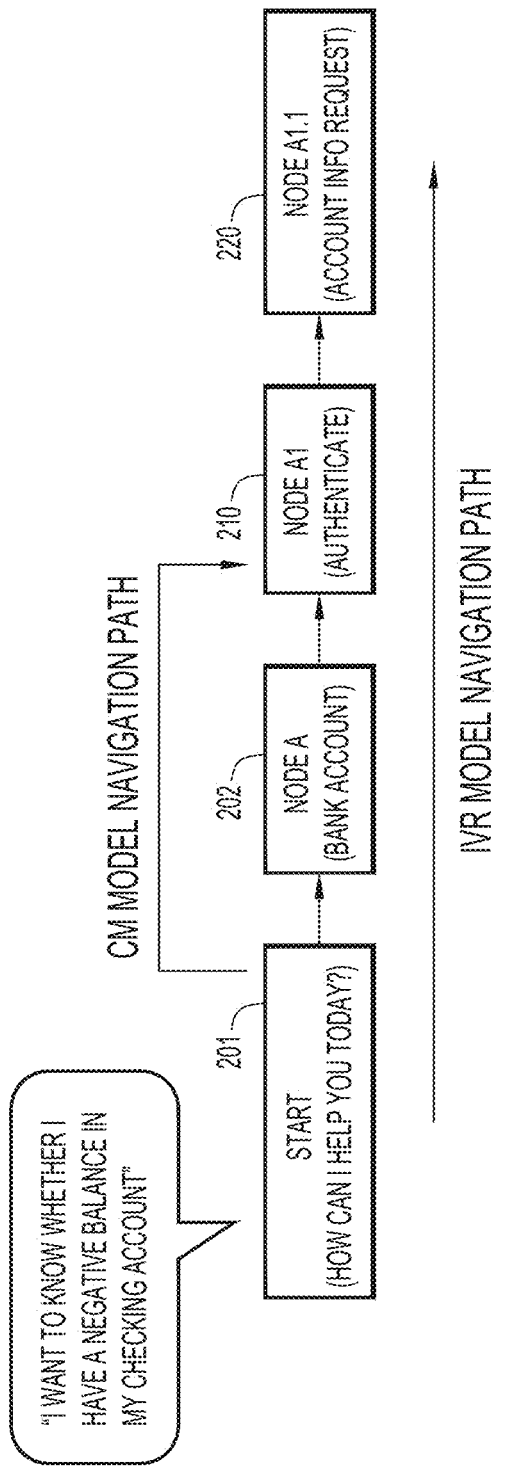

The diagrams at FIGS. 6A-6C demonstrate examples regarding how the CM model can be utilized to bypass nodes that would otherwise be traversed utilizing the IVR model in the IVR navigation of the IVR tree 200 based upon the initial or first utterance by a caller. For example, referring to FIG. 6A, an utterance by the caller of "I want information on refinancing my home mortgage loan" would immediately direct the caller to the endpoint node B2.1.2 and corresponding endpoint (e.g., a call agent specializing in home mortgage refinancing) utilizing the CM model, which bypasses nodes B, B2, and B2.1 that would otherwise need to be traversed utilizing the IVR model/IVR navigation. Similarly, referring to FIG. 6B, an utterance by the caller of "I am interested in what new credit card deals or promotions you are currently running" would immediately direct the caller to the endpoint node C2 and corresponding endpoint (e.g., an automated message) utilizing the CM model and therefore bypass Node C using the IVR model/IVR navigation. Further, in FIG. 6C, a request by the caller such as "I want to know whether I have a negative balance in my checking account" would result in bypassing at least node A utilizing the CM model. However, the caller would still need to satisfy the requirements of node A1 (authentication by caller prior to receiving account information) before being directed to endpoint node A1.1 and endpoint (e.g., automated response providing account information, including account balance).

Thus, the embodiments described herein facilitate an easier and more efficient and customer friendly manner in which to direct a caller who has called a contact center to a desired endpoint (e.g., automated response with desired information, or a live call agent suited for providing the desired information to the caller) quickly and accurately. By overlaying or integrating a CM model with an IVR model, the CM model can constantly learn and evolve to understand where to direct a current caller to a suitable endpoint based upon the first or initial utterance by the caller as well as utilizing the hierarchical IVR tree of nodes provided by the IVR model.

Figure 7:
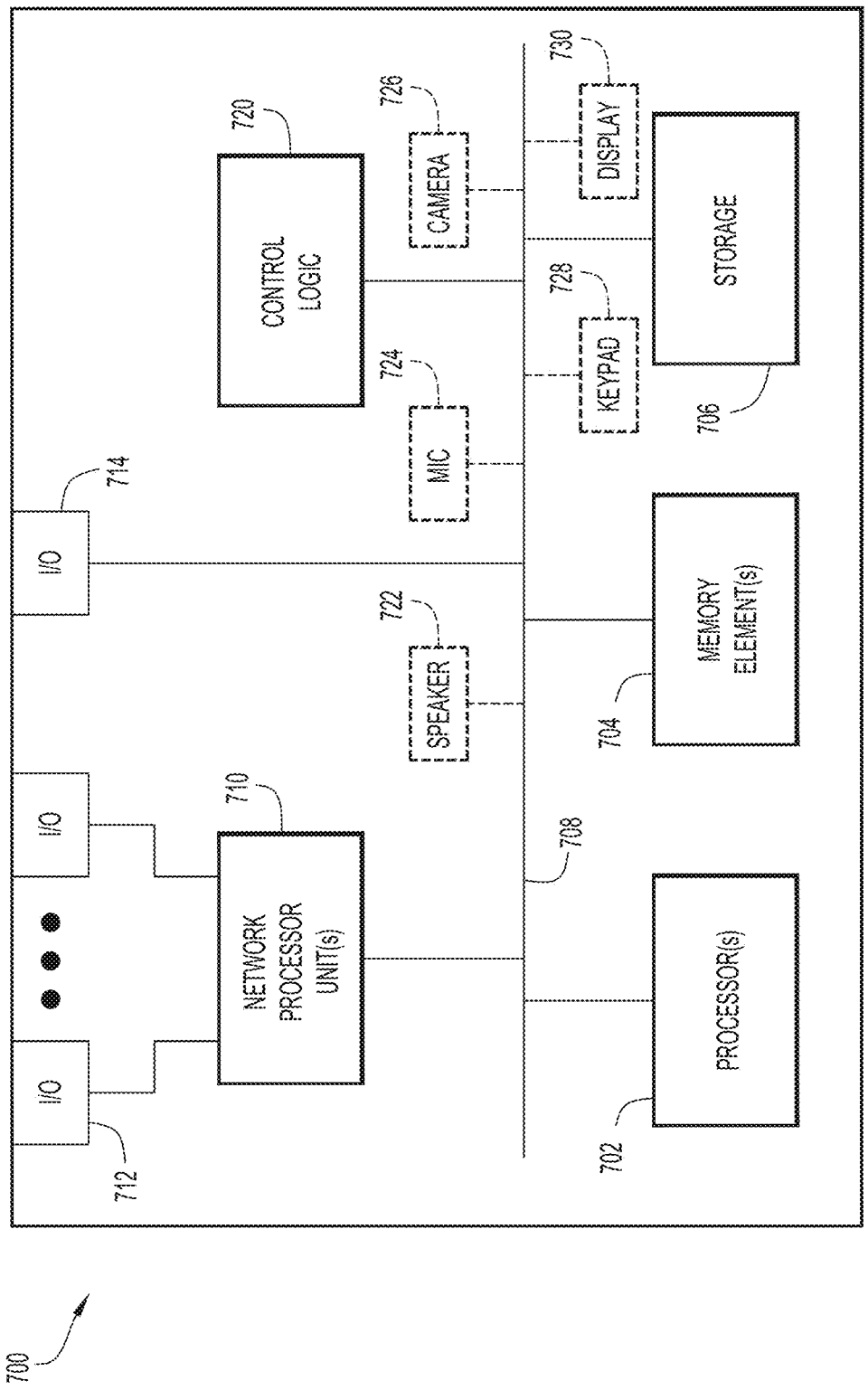
FIG. 7 illustrates a hardware block diagram of a computing device configured to perform contact center operations in relation to processing calls utilizing IVR navigation and/or CM navigation according to example embodiments described herein.

Embodiments of communication devices and computing devices suitable for performing the operations as described herein are described with reference to FIG. 7. In particular, a hardware block diagram of a computing device 700 is depicted that may perform operations in relation to the embodiments described herein and depicted in FIGS. 1-6. In various embodiments, a computing device, apparatus, or system, such as computing device 700 or any combination of computing devices 700, may be configured as any entity/ entities (e.g., computer devices, contact center systems, caller or call agent communication devices, etc.) as discussed for the methods and operations described herein.

The computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700 (e.g., the various software modules as described herein). Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor".

Memory element(s) 704 and/or storage 706 can be configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory elements 704 (or vice versa) or can overlap/exist in any other suitable manner.

Bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/ modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interfaces 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device(s) for the contact center, endpoint devices such as caller communication devices and call agent communication devices, etc.), computing device 700 may further include, or be coupled to, an audio speaker 722 to convey sound, microphone or other sound sensing device 724, camera or image capture device 726, a keypad or keyboard 728 to enter information (e.g., alphanumeric information, etc.), and/or a touch screen or other display 730. These items may be coupled to bus 708 or I/O interface(s) 714 to transfer data with other elements of computing device 700.

In various embodiments, control logic 720 can include instructions that, when executed, cause processor(s) 702 to perform operations, which can include, but not be limited to, providing overall control operations of computing device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, the CM model operated by the CM module can learn (e.g., through training as previously described herein) and establish connections between introductory verbal communications or utterances by callers with appropriate endpoints of information in the contact center (e.g., endpoint nodes in IVR trees and corresponding endpoints comprising suitable call agents and/or suitable automated messages of information), thereby increasing accuracy and reducing unnecessary processing for initiating further actions (e.g., bypassing nodes and reducing traversal of IVR trees as well as facilitating additional unnecessary interactions with live call agents). This reduces consumption of processing and memory/storage resources to improve computing performance. In previous embodiments described herein (see, e.g., FIGS. 6A, 6B and 6C), the CM model implemented computing devices reduces automated interactions between caller and contact center by avoiding nodes and node layers in traversing an IVR tree, thus eliminating processing steps required to traverse each node in the IVR tree to an endpoint node.

The programs and software described herein (in the form of modules, e.g., IVR module, CM module, ASR module, etc.) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments (e.g., IVR module 122, CM module 124, etc.) may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among various computers including end-user or client (e.g., caller and call agent), server (e.g., contact center), and other processing devices or systems, and/or any other intermediary processing devices. The software and/or algorithms described above and illustrated in the flowchart and diagrams may be modified in any manner that accomplishes the functions described herein. In addition, the functions in the flowchart, diagrams, or description may be performed in any order that accomplishes a desired operation.

The networks of present embodiments may be implemented by any number of any type of communications network (e.g., PSTN, LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the device elements described herein may couple to and/or interact with one another through interfaces and/or through any other suitable connection (wired or wireless) that provides a viable pathway for communications. Interconnections, interfaces, and variations thereof discussed herein may be utilized to provide connections among device elements in a system and/or may be utilized to provide communications, interactions, operations, etc. among device elements that may be directly or indirectly connected in the system. Any combination of interfaces can be provided for device elements described herein in order to facilitate operations as discussed for various embodiments described herein.

In various embodiments, any entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items described herein should be construed as being encompassed within the broad term "memory element". Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory elements 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments (e.g., IVR module 122, CM module 124, etc.) may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any PSTN network, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as "messages", "messaging", "signaling", "data", "content", "objects", "requests", "queries", "responses", "replies", etc. which may be inclusive of packets. As referred to herein and in the claims, the term "packet" may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a "payload", "data payload", and variations thereof. In some embodiments, control or routing information, management information, or the like can be included in packet fields, such as within header(s) and/or trailer(s) of packets. Internet Protocol (IP) addresses can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, computer node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase "at least one of", "one or more of", "and/or", variations thereof, or the like are open-ended expressions that are both conjunctive and disjunctive in operation for any and all possible combinations of the associated listed items. For example, each of the expressions "at least one of X, Y and Z", "at least one of X, Y or Z", "one or more of X, Y and Z", "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously described features in different example embodiments into a single system or method.

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided that comprises, at a contact center that operates to provide customer service to callers by receiving calls from the callers and directing the callers to desired endpoints that deliver information to the callers based upon an expressed intent of each caller associated with each call, selecting whether to process a current call by a current caller received by the contact center utilizing an Interactive Voice Response (IVR) model or a Conversational Menu (CM) model. In response to a selection of the IVR model to process the current call, the current caller is directed to a selected endpoint by requiring the current caller to navigate through a hierarchical IVR tree of nodes, each node including a set of options selectable by the caller in which a selected option from the set of options determines a next node in which to advance along the hierarchical IVR tree of nodes, and the selected endpoint for the current caller is reached based upon a specific navigational path along a plurality of nodes within the hierarchical IVR tree of nodes. In response to a selection of the CM model to process the current call, a verbal utterance of the current caller at an initiation of the current call is analyzed, where the analyzing comprises obtaining words from the verbal utterance and, based upon the analyzing of the verbal utterance, the caller during the current call is directed to the selected endpoint so as to bypass nodes within the specific navigational path of nodes along the IVR hierarchical tree that leads to the selected endpoint.

The selected endpoint can comprise an automated message providing information to the current caller based upon the expressed intent of the caller and/or a live call agent to speak with the current caller based upon the expressed intent of the caller.

The method can further comprise linking one or more words from previous verbal utterances by previous callers obtained from a plurality of previous calls to the contact center with specific endpoints that are associated with specific navigational paths along nodes of the hierarchical IVR tree of nodes, where, in response to selection of the CM model to process the current call, the analyzing the verbal utterance comprises matching a selected number of one or more words from the verbal utterance of the current caller with one or more words from one or more previous verbal utterances linked with the selected endpoint. The selecting whether to process the current call utilizing the IVR model or the CM model can comprise sampling a selected percentage of all incoming calls to the contact center for processing via the IVR model. In addition, the selecting whether to process the current call utilizing the IVR model or the CM model can comprise determining a confidence score for the CM model based upon processing of a number of previous calls utilizing the IVR model to the contact center, and determining whether to use the IVR model or the CM model to process the current call based upon whether the confidence score satisfies a threshold value.

In the method, the confidence score can further be determined based upon identifying a selected number of previous calls to the contact center as unique calls, and a previous call is identified as a unique call when a selected number of one or more words of the verbal utterance for the previous call failed to match one or more words linked with any endpoint reached by every navigational path along the hierarchical IVR tree of nodes.

Further, in the method, the analyzing the verbal utterance of the current caller at the initiation of the current call can comprise parsing the verbal utterance by shortening a number of words in the verbal utterance to keywords that are used to determine the selected endpoint to which the current call is directed.

In another form, an apparatus comprises a memory configured to store instructions including one or more applications that facilitates operations of a contact center over a network, wherein the contact center operates to provide customer service to callers by receiving calls from the callers and directing the callers to desired endpoints that deliver information to the callers based upon an expressed intent of each caller associated with each call. The apparatus further comprises a processor configured to execute and control operations of the one or more applications so as to select whether to process a current call by a current caller received by the contact center utilizing an Interactive Voice Response (IVR) model or a Conversational Menu (CM) model. In response to a selection of the IVR model to process the current call, the current caller is directed to a selected endpoint by requiring the current caller to navigate through a hierarchical IVR tree of nodes, each node including a set of options selectable by the caller in which a selected option from the set of options determines a next node in which to advance along the hierarchical IVR tree of nodes, and the selected endpoint for the current caller is reached based upon a specific navigational path along a plurality of nodes within the hierarchical IVR tree of nodes. In response to a selection of the CM model to process the current call, a verbal utterance of the current caller is analyzed at an initiation of the current call, the analyzing comprising obtaining words from the verbal utterance. Based upon the analyzing of the verbal utterance, the caller during the current call is directed to the selected endpoint so as to bypass nodes within the specific navigational path of nodes along the IVR hierarchical tree that leads to the selected endpoint.

In the apparatus, the selected endpoint can comprise an automated message providing information to the current caller based upon the expressed intent of the caller and/or a live call agent to speak with the current caller based upon the expressed intent of the caller.

The processor of the apparatus can further be configured to execute and control operations of the one or more applications so as to link one or more words from previous verbal utterances by previous callers obtained from a plurality of previous calls to the contact center with specific endpoints that are associated with specific navigational paths along nodes of the hierarchical IVR tree of nodes. In response to selection of the CM model to process the current call, the processor can further be configured to analyze the verbal utterance by matching a selected number of one or more words from the verbal utterance of the current caller with one or more words from one or more previous verbal utterances linked with the selected endpoint.

The processor of the apparatus can select whether to process the current call utilizing the IVR model or the CM model by sampling a selected percentage of all incoming calls to the contact center for processing via the IVR model.

The processor of the apparatus can select whether to process the current call utilizing the IVR model or the CM model by determining a confidence score for the CM model based upon processing of a number of previous calls utilizing the IVR model to the contact center, and determining whether to use the IVR model or the CM model to process the current call based upon whether the confidence score satisfies a threshold value.

In the apparatus, the confidence score can further be determined based upon the processor identifying a selected number of previous calls to the contact center as unique calls, and a previous call can be identified by the processor as a unique call when a selected number of one or more words of the verbal utterance for the previous call failed to match one or more words linked with any endpoint reached by every navigational path along the hierarchical IVR tree of nodes. [moo] In a further form, one or more computer readable storage media are encoded with software comprising computer executable instructions and when the software is executed operable to perform the following features: at a contact center that operates to provide customer service to callers by receiving calls from the callers and directing the callers to desired endpoints that deliver information to the callers based upon an expressed intent of each caller associated with each call, select whether to process a current call by a current caller received by the contact center utilizing an Interactive Voice Response (IVR) model or a Conversational Menu (CM) model. In response to a selection of the IVR model to process the current call, the current caller is directed to a selected endpoint by requiring the current caller to navigate through a hierarchical IVR tree of nodes, each node including a set of options selectable by the caller in which a selected option from the set of options determines a next node in which to advance along the hierarchical IVR tree of nodes, and the selected endpoint for the current caller is reached based upon a specific navigational path along a plurality of nodes within the hierarchical IVR tree of nodes. In n response to a selection of the CM model to process the current call, a verbal utterance of the current caller at an initiation of the current call is analyzed, the analyzing comprising obtaining words from the verbal utterance and, based upon the analyzing of the verbal utterance, directing the caller during the current call to the selected endpoint so as to bypass nodes within the specific navigational path of nodes along the IVR hierarchical tree that leads to the selected endpoint.

The selected endpoint for the one or more computer readable storage media can comprise an automated message providing information to the current caller based upon the expressed intent of the caller and/or a live call agent to speak with the current caller based upon the expressed intent of the caller.

The instructions of the one or more computer readable storage media can be further operable to link one or more words from previous verbal utterances by previous callers obtained from a plurality of previous calls to the contact center with specific endpoints that are associated with specific navigational paths along nodes of the hierarchical IVR tree of nodes where, in response to selection of the CM model to process the current call, the analyzing the verbal utterance can comprise matching a selected number of one or more words from the verbal utterance of the current caller with one or more words from one or more previous verbal utterances linked with the selected endpoint.

The instructions of the one or more computer readable storage media can further be operable to select whether to process the current call utilizing the IVR model or the CM model by sampling a selected percentage of all incoming calls to the contact center for processing via the IVR model.

The instructions of the one or more computer readable storage media can further be operable to select whether to process the current call utilizing the IVR model or the CM model by determining a confidence score for the CM model based upon processing of a number of previous calls utilizing the IVR model to the contact center, and determining whether to use the IVR model or the CM model to process the current call based upon whether the confidence score satisfies a threshold value.

The instructions of the one or more computer readable storage media can further be operable to determine the confidence score based upon identifying a selected number of previous calls to the contact center as unique calls, and a previous call is identified as a unique call when a selected number of one or more words of the verbal utterance for the previous call failed to match one or more words linked with any endpoint reached by every navigational path along the hierarchical IVR tree of nodes.

The instructions of the one or more computer readable storage media can further be operable to analyze the verbal utterance of the current caller at the initiation of the current call by parsing the verbal utterance by shortening a number of words in the verbal utterance to keywords that are used to determine the selected endpoint to which the current call is directed.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a contact center that operates to provide customer service to callers by receiving calls from the callers and directing the callers to desired endpoints that deliver information to the callers based upon an expressed intent of each caller associated with each call, selecting whether to process a current call by a current caller received by the contact center utilizing an Interactive Voice Response (IVR) model or a Conversational Menu (CM) model;
    in response to a selection of the IVR model to process the current call:
        directing the current caller to a selected endpoint by requiring the current caller to navigate through a hierarchical IVR tree of nodes, each node including a set of options selectable by the caller in which a selected option from the set of options determines a next node in which to advance along the hierarchical IVR tree of nodes; and
        reaching the selected endpoint for the current caller based upon a specific navigational path along a plurality of nodes within the hierarchical IVR tree of nodes; and
    in response to a selection of the CM model to process the current call:
        analyzing a verbal utterance of the current caller at an initiation of the current call, the analyzing comprising parsing the verbal utterance to select one or more keywords that are used to determine the selected endpoint to which the current call is directed; and
        based upon the analyzing of the verbal utterance, directing the caller during the current call to the selected endpoint so as to bypass nodes within the specific navigational path of nodes along the IVR hierarchical tree that leads to the selected endpoint.

2. The method of claim 1, wherein the selected endpoint comprises an automated message providing information to the current caller based upon the expressed intent of the caller and/or a live call agent to speak with the current caller based upon the expressed intent of the caller.

3. The method of claim 1, further comprising:
    linking one or more words from previous verbal utterances by previous callers obtained from a plurality of previous calls to the contact center with specific endpoints that are associated with specific navigational paths along nodes of the hierarchical IVR tree of nodes;
    wherein, in response to selection of the CM model to process the current call, the analyzing the verbal utterance comprises matching a selected number of one or more words from the verbal utterance of the current caller with one or more words from one or more previous verbal utterances linked with the selected endpoint.

4. The method of claim 3, wherein the selecting whether to process the current call utilizing the IVR model or the CM model comprises sampling a selected percentage of all incoming calls to the contact center for processing via the IVR model.

5. The method of claim 3, wherein the selecting whether to process the current call utilizing the IVR model or the CM model comprises:
    determining a confidence score for the CM model based upon processing of a number of previous calls utilizing the IVR model to the contact center; and
    determining whether to use the IVR model or the CM model to process the current call based upon whether the confidence score satisfies a threshold value.

6. The method of claim 5, wherein the confidence score is further determined based upon identifying a selected number of previous calls to the contact center as unique calls, and a previous call is identified as a unique call when a selected number of one or more words of the verbal utterance for the previous call failed to match one or more words linked with any endpoint reached by every navigational path along the hierarchical IVR tree of nodes.

7. The method of claim 1, wherein the analyzing the verbal utterance of the current caller at the initiation of the current call comprises parsing the verbal utterance by shortening a number of words in the verbal utterance to the one or more keywords that are used to determine the selected endpoint to which the current call is directed.

8. The method of claim 1, wherein the selecting whether to process the current call utilizing the IVR model or the CM model comprises:
   determining a confidence score for the CM model based upon feedback information provided by the callers; and
   determining whether to use the IVR model or the CM model to process the current call based upon whether the confidence score satisfies a threshold value.

9. The method of claim 8, wherein the feedback information is provided by the callers via a customer survey taken at an end of a call.

10. An apparatus comprising:
    a memory configured to store instructions including one or more applications that facilitates operations of a contact center over a network, wherein the contact center operates to provide customer service to callers by receiving calls from the callers and directing the callers to desired endpoints that deliver information to the callers based upon an expressed intent of each caller associated with each call; and
    a processor configured to execute and control operations of the one or more applications so as to:
    select whether to process a current call by a current caller received by the contact center utilizing an Interactive Voice Response (IVR) model or a Conversational Menu (CM) model;
    in response to a selection of the IVR model to process the current call:
        direct the current caller to a selected endpoint by requiring the current caller to navigate through a hierarchical IVR tree of nodes, each node including a set of options selectable by the caller in which a selected option from the set of options determines a next node in which to advance along the hierarchical IVR tree of nodes; and
        reach the selected endpoint for the current caller based upon a specific navigational path along a plurality of nodes within the hierarchical IVR tree of nodes; and
    in response to a selection of the CM model to process the current call:
        analyze a verbal utterance of the current caller at an initiation of the current call, the analyzing comprising parsing from the verbal utterance to select one or more keywords that are used to determine the selected endpoint to which the current call is directed; and
        based upon the analyzing of the verbal utterance, direct the caller during the current call to the selected endpoint so as to bypass nodes within the specific navigational path of nodes along the IVR hierarchical tree that leads to the selected endpoint.

11. The apparatus of claim 10, wherein the selected endpoint comprises an automated message providing information to the current caller based upon the expressed intent of the caller and/or a live call agent to speak with the current caller based upon the expressed intent of the caller.

12. The apparatus of claim 10, wherein the processor is further configured to execute and control operations of the one or more applications so as to:
    link one or more words from previous verbal utterances by previous callers obtained from a plurality of previous calls to the contact center with specific endpoints that are associated with specific navigational paths along nodes of the hierarchical IVR tree of nodes;
    wherein, in response to selection of the CM model to process the current call, the processor is further configured to analyze the verbal utterance by matching a selected number of one or more words from the verbal utterance of the current caller with one or more words from one or more previous verbal utterances linked with the selected endpoint.

13. The apparatus of claim 12, wherein the processor selects whether to process the current call utilizing the IVR model or the CM model by sampling a selected percentage of all incoming calls to the contact center for processing via the IVR model.

14. The apparatus of claim 12, wherein the processor selects whether to process the current call utilizing the IVR model or the CM model by:
    determining a confidence score for the CM model based upon processing of a number of previous calls utilizing the IVR model to the contact center; and
    determining whether to use the IVR model or the CM model to process the current call based upon whether the confidence score satisfies a threshold value.

15. The apparatus of claim 14, wherein the confidence score is further determined based upon the processor identifying a selected number of previous calls to the contact center as unique calls, and a previous call is identified by the processor as a unique call when a selected number of one or more words of the verbal utterance for the previous call failed to match one or more words linked with any endpoint reached by every navigational path along the hierarchical IVR tree of nodes.

16. One or more non-transitory computer readable storage media encoded with software comprising computer executable instructions and when the software is executed operable to:
    at a contact center that operates to provide customer service to callers by receiving calls from the callers and directing the callers to desired endpoints that deliver information to the callers based upon an expressed intent of each caller associated with each call, select whether to process a current call by a current caller received by the contact center utilizing an Interactive Voice Response (IVR) model or a Conversational Menu (CM) model;
    in response to a selection of the IVR model to process the current call:
        direct the current caller to a selected endpoint by requiring the current caller to navigate through a hierarchical IVR tree of nodes, each node including a set of options selectable by the caller in which a selected option from the set of options determines a next node in which to advance along the hierarchical IVR tree of nodes; and
        reach the selected endpoint for the current caller based upon a specific navigational path along a plurality of nodes within the hierarchical IVR tree of nodes; and
    in response to a selection of the CM model to process the current call:
        analyze a verbal utterance of the current caller at an initiation of the current call, the analyzing comprising parsing the verbal utterance to select one or more keywords that are used to determine the selected endpoint to which the current call is directed; and based upon the analyzing of the verbal utterance, direct the caller during the current call to the selected endpoint so as to bypass nodes within the specific navigational path of nodes along the IVR hierarchical tree that leads to the selected endpoint.

17. The one or more non-transitory computer readable storage media of claim 16, wherein the selected endpoint comprises an automated message providing information to the current caller based upon the expressed intent of the caller and/or a live call agent to speak with the current caller based upon the expressed intent of the caller.

18. The one or more non-transitory computer readable storage media of claim 16, wherein the instructions are further operable to:
  link one or more words from previous verbal utterances by previous callers obtained from a plurality of previous calls to the contact center with specific endpoints that are associated with specific navigational paths along nodes of the hierarchical IVR tree of nodes;
  wherein, in response to selection of the CM model to process the current call, the analyzing the verbal utterance comprises matching a selected number of one or more words from the verbal utterance of the current caller with one or more words from one or more previous verbal utterances linked with the selected endpoint.

19. The one or more non-transitory computer readable storage media of claim 18, wherein the instructions are further operable to select whether to process the current call utilizing the IVR model or the CM model by sampling a selected percentage of all incoming calls to the contact center for processing via the IVR model.

20. The one or more non-transitory computer readable storage media of claim 18, wherein the instructions are further operable to select whether to process the current call utilizing the IVR model or the CM model by:
  determining a confidence score for the CM model based upon processing of a number of previous calls utilizing the IVR model to the contact center; and
  determining whether to use the IVR model or the CM model to process the current call based upon whether the confidence score satisfies a threshold value.

21. The one or more non-transitory computer readable storage media of claim 20, wherein the instructions are further operable to determine the confidence score based upon identifying a selected number of previous calls to the contact center as unique calls, and a previous call is identified as a unique call when a selected number of one or more words of the verbal utterance for the previous call failed to match one or more words linked with any endpoint reached by every navigational path along the hierarchical IVR tree of nodes.

22. The one or more non-transitory computer readable storage media of claim 16, wherein the instructions are further operable to analyze the verbal utterance of the current caller at the initiation of the current call by parsing the verbal utterance by shortening a number of words in the verbal utterance to the one or more keywords that are used to determine the selected endpoint to which the current call is directed.

\* \* \* \* \*